(12) United States Patent
Jin

(10) Patent No.: US 12,392,467 B2
(45) Date of Patent: Aug. 19, 2025

(54) LAMP FOR VEHICLE

(71) Applicant: HYUNDAI MOBIS CO., LTD., Seoul (KR)

(72) Inventor: Min Ji Jin, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 18/457,449

(22) Filed: Aug. 29, 2023

(65) Prior Publication Data
US 2024/0200743 A1    Jun. 20, 2024

(30) Foreign Application Priority Data
Dec. 19, 2022  (KR) .................. 10-2022-0178552

(51) Int. Cl.
*F21S 41/20* (2018.01)
*B60Q 1/14* (2006.01)
*F21S 41/40* (2018.01)
*F21W 102/20* (2018.01)

(52) U.S. Cl.
CPC .......... *F21S 41/285* (2018.01); *B60Q 1/1415* (2013.01); *F21S 41/40* (2018.01); *F21W 2102/20* (2018.01)

(58) Field of Classification Search
CPC ........ F21S 41/285; F21S 41/40; F21S 41/143; F21S 41/25; F21S 41/255; F21S 41/26; F21S 41/265; F21S 41/27
See application file for complete search history.

(56) References Cited

U.S. PATENT DOCUMENTS

| | | | | |
|---|---|---|---|---|
| 10,260,694 | B2* | 4/2019 | Kasano | F21S 41/255 |
| 11,732,855 | B2* | 8/2023 | Han | F21S 43/243 |
| | | | | 362/219 |
| 11,808,428 | B2* | 11/2023 | Jung | F21S 41/43 |
| 11,898,715 | B2* | 2/2024 | Han | F21S 41/148 |
| 2021/0341123 | A1* | 11/2021 | Mototsuji | F21S 41/143 |

* cited by examiner

*Primary Examiner* — Matthew J. Peerce
(74) *Attorney, Agent, or Firm* — NovoTechIP International PLLC

(57) ABSTRACT

Disclosed is a lamp for a vehicle including a first lamp module including a first light source part, and a first lens part that forms a first light distribution pattern with light irradiated from the first light source part, a second lamp module including a second light source part, and a second lens part that forms a second light distribution pattern with light irradiated from the second light source part, and a third lamp module including a third light source part, and a third lens part that forms a third light distribution pattern with light irradiated from the third light source part, the first lens part, the second lens part, and the third lens part are connected to each other to define one body having a light output lens surface including multi-facet lenses formed to be gradually stepped from an inboard side to an outboard side of the vehicle.

18 Claims, 12 Drawing Sheets

LAMP FOR VEHICLE

CROSS-REFERENCE TO RELATED APPLICATIONS

This application claims the benefit of priority to Korean Patent Application No. 10-2022-0178552, filed in the Korean Intellectual Property Office on Dec. 19, 2022, the entire contents of which are incorporated herein by reference.

TECHNICAL FIELD

The present disclosure relates to a lamp for a vehicle.

BACKGROUND

In general, a vehicle is provided with various kinds of lamps having lighting functions for easily identifying objects located around the vehicle during nighttime driving, and signal functions for notifying other vehicles or road users of a driving state of the vehicle.

Among the lamps for a vehicle, headlamps that form low beam patterns or high beam patterns to help a driver to secure a front field of view take an important role in safe driving. Furthermore, in recent years, differentiation of designs of the headlamps has become important.

To differentiate designs of the lamp for a vehicle, in recent years, the lamps of a slim design having a low height and having a leftward/rightward width have been used. The slim lamp also is designed to have a curvature according to design curvature of an outer lens.

Conventional methods for providing a curvature to a slim lamp include a method for forming a curvature such that a slim output lens corresponds to a curvature of an outer lens and a method for arranging a plurality of lamp modules formed in a cube form in a stepped manner.

However, among the conventional technologies, the method for forming a curvature by deflecting a slim output lens cannot satisfy an optical performance as glares are formed in a leftward/rightward direction due to the deflection. Furthermore, according to the method for arranging the plurality of lamp modules in a cube form in a stepped manner, a light distribution image and a lamp image are formed discontinuously. Accordingly, it is necessary to improve a technology for providing a curvature with neither glare phenomenon nor intermittent texture of the lamp of the slim design.

SUMMARY

The present disclosure has been made to solve the above-mentioned problems occurring in the prior art while advantages achieved by the prior art are maintained intact.

An aspect of the present disclosure provides a lamp for a vehicle that satisfies an optical performance while implementing a continuous lighting image and a continuous lamp image.

Another aspect of the present disclosure provides a lamp for a vehicle that satisfies an optical performance with no glare phenomenon even when a slim output lens having a curvature is used.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a first lamp module including a first light source part, and a first lens part that forms a first light distribution pattern with light irradiated from the first light source part, a second lamp module including a second light source part, and a second lens part that forms a second light distribution pattern with light irradiated from the second light source part, and a third lamp module including a third light source part, and a third lens part that forms a third light distribution pattern with light irradiated from the third light source part, the first lens part, the second lens part, and the third lens part are connected to each other to define one body, an output surface of the first lens part, an output surface of the second lens part, and an output surface of the third lens part are integrated to form one light output lens surface, and the light output lens surface includes a plurality of multi-facet lenses formed to be gradually stepped toward an opposite direction to an output direction that is a direction, in which the light is output, as it goes from one side to an opposite side in a leftward/rightward direction.

The first lamp module, the second lamp module, and the third lamp module may be arranged in a specific form, and one or a plurality of first lamp modules, one or a plurality of second lamp modules, and one or a plurality of third lamp modules may be provided.

The plurality of multi-facet lenses may be formed such that steps between adjacent multi-facet lenses become larger as they go from the one side to the opposite side in the leftward/rightward direction.

When an imaginary surface obtained by connecting centers of adjacent multi-facet lenses in the leftward/rightward direction is defined as an imaginary inclined surface, an angle of the imaginary inclined surface may be formed to become larger in a lamp module disposed from the one side more toward the opposite side of the light output lens surface in the leftward/rightward direction.

The first lens part may include a first input surface, to which the light is input, the second lens part may include a second input surface, to which the light is input, the third lens part may include a third input surface, to which the light is input, and the first input surface, the second input surface, and the third input surface may be formed to be stepped to face the opposite direction to the output direction as they go from the one side to the opposite side in the leftward/rightward direction.

A plurality of first lamp modules, a plurality of second lamp modules, and a plurality of third lamp modules may be provided, a plurality of first input surfaces provided in the plurality of first lamp modules may be stepped with each other, a plurality of second input surfaces provided in the plurality of second lamp modules may be stepped with each other, and a plurality of third input surfaces provided in the plurality of third lamp modules may be stepped with each other.

A horizontal focus and a vertical focus of the first lens part may be formed to be the same (i.e., coincident), and a horizontal focus and a vertical focus of the second lens part may be formed to be the same.

A location of the third lens part, at which the light is concentrated on a horizontal direction, and a location of the third lens part, at which the light is concentrated on a vertical direction, may be different (i.e., noncoincident).

The first lamp module may include a first reflection part that concentrates the light irradiated from the first light source part, the second lamp module may include a second reflection part that concentrates the light irradiated from the second light source part, the third lamp module may include a third reflection part that concentrates the light irradiated from the third light source part, and sizes and shapes of the first reflection part, the second reflection part, and the third reflection part may be formed to be different.

The first reflection part, the second reflection part, and the third reflection part may be disposed to face the opposite direction to the output direction as they go from the one side to the opposite side in the leftward/rightward direction.

The first lamp module may include a first shield part that shields a portion of the light reflected by the first reflection part, the second lamp module may include a second shield part that shields a portion of the light reflected by the second reflection part, the third lamp module may include a third shield part that shields a portion of the light reflected by the third reflection part, and the first shield part, the second shield part, and the third shield part may have different sizes and shapes from one another.

The first shield part, the second shield part, and the third shield part may be disposed to face the opposite direction to the output direction as they go from the one side to the opposite side in the leftward/rightward direction.

The third shield part may be disposed on a vertical focus of the third lens part.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, embodiments described hereinafter are embodiments that are suitable for helping understand technical features of a lamp for a vehicle. However, neither the present disclosure is limited by the embodiments that will be described below nor the technical features of the present disclosure are not limited by the described embodiments, and the present disclosure may be variously modified within the technical features of the present disclosure.

Figure 1:
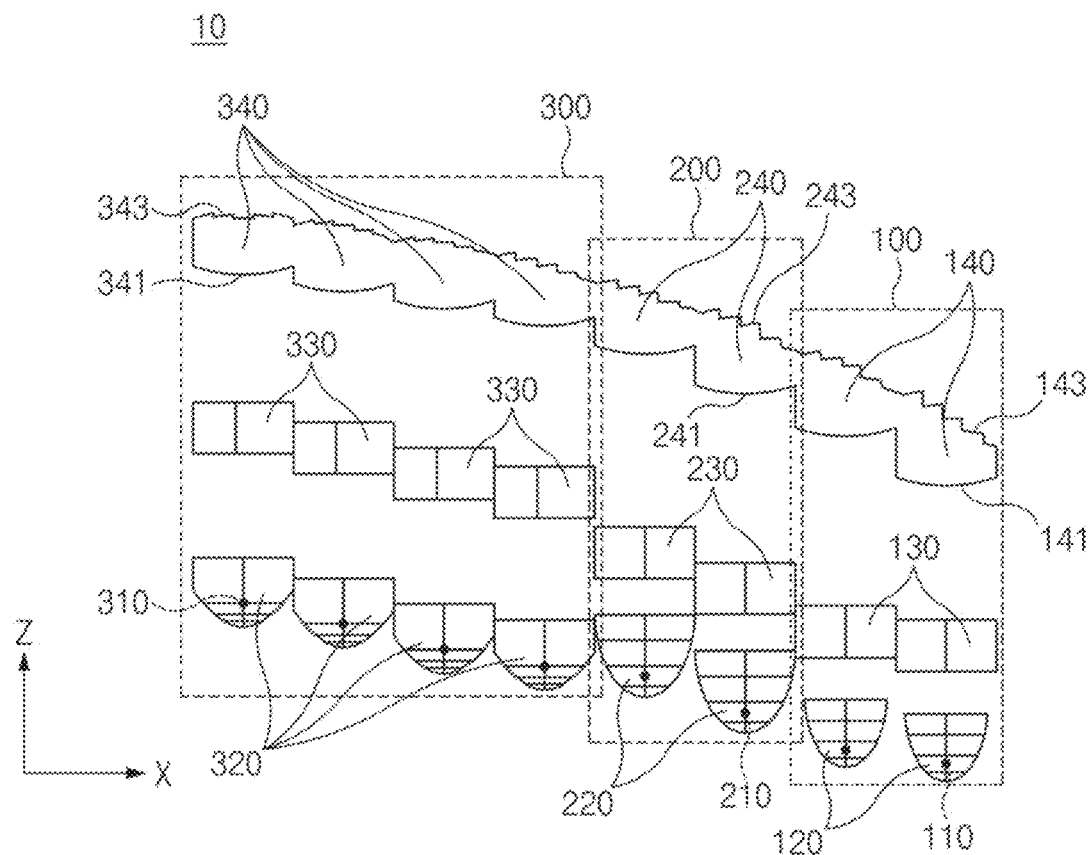
FIG. 1 is a view schematically illustrating a configuration of a lamp for a vehicle according to an embodiment of the present disclosure.
Figure 1:
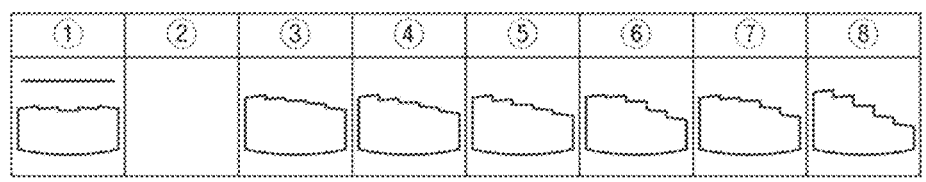
Figure 2:
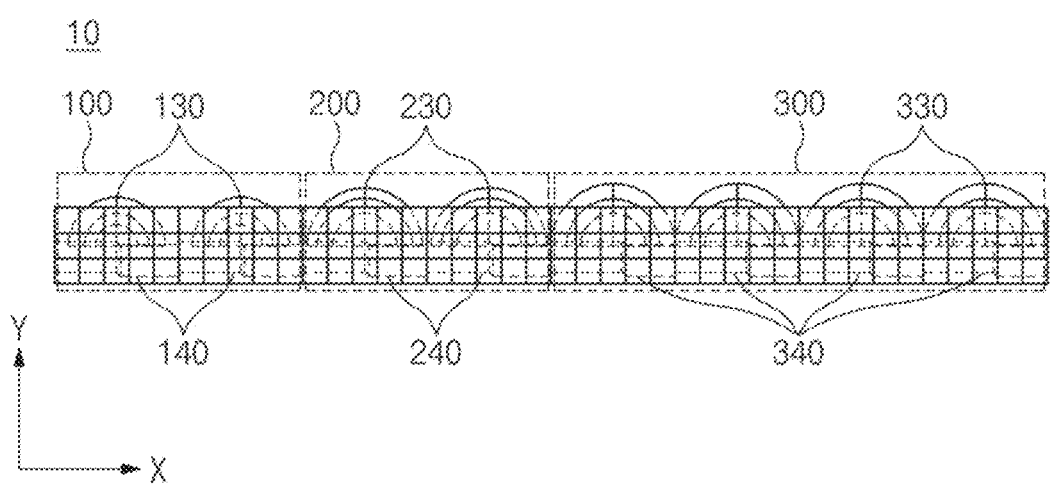
FIG. 2 illustrates a lamp for a vehicle according to an embodiment of the present disclosure, and is a front view viewed toward a light output lens surface.
Figure 3:
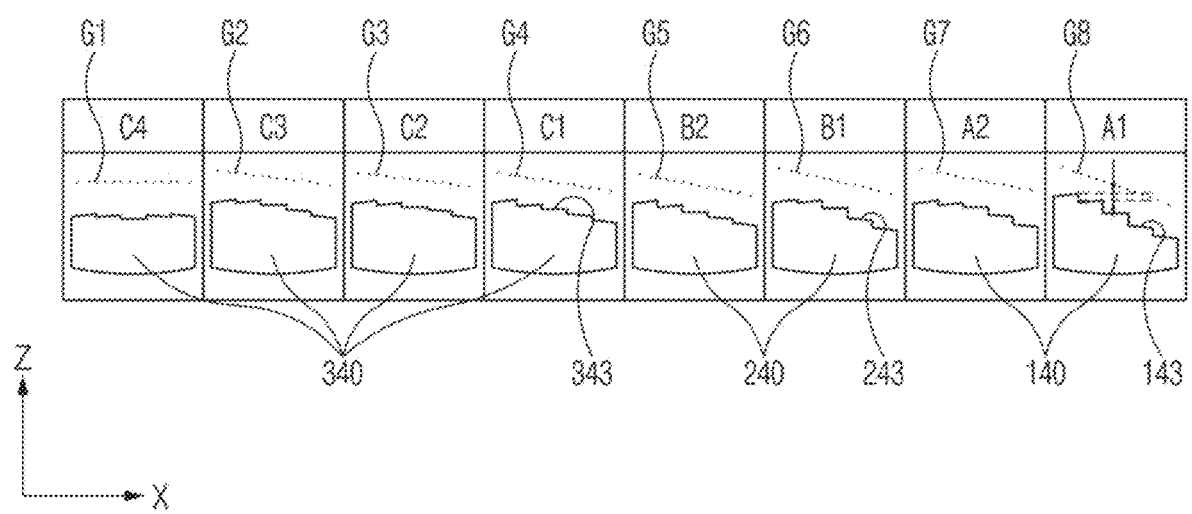
FIG. 3 illustrates a first lens part, a second lens part, and a third lens part for each lamp module according to an embodiment of the present disclosure.
Figure 4:
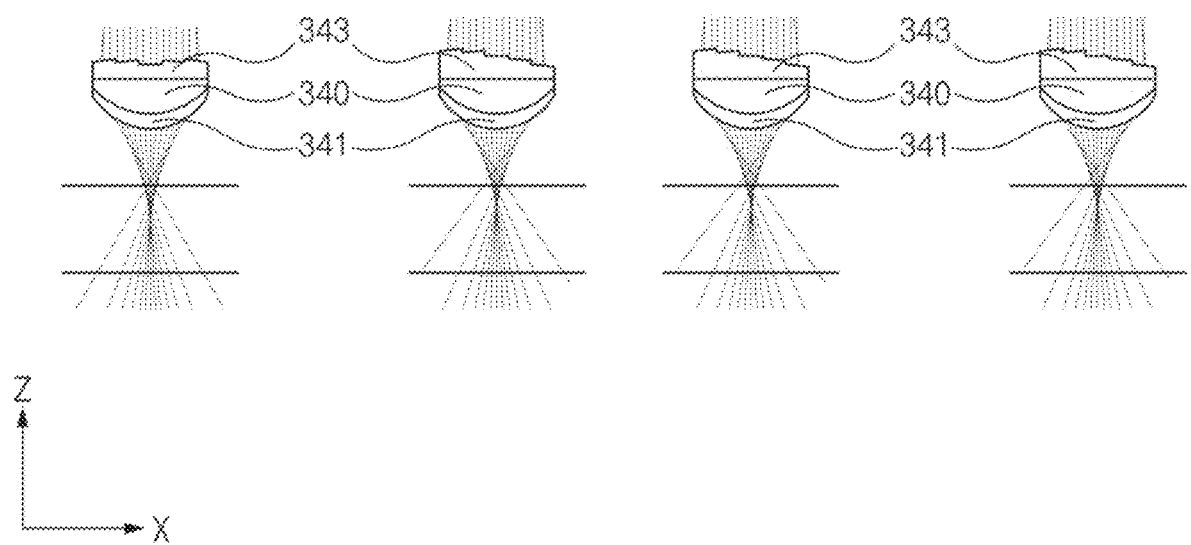
FIG. 4 is a top view of a plurality of third lens parts, when viewed from a top, according to an embodiment of the present disclosure.
Figure 5:
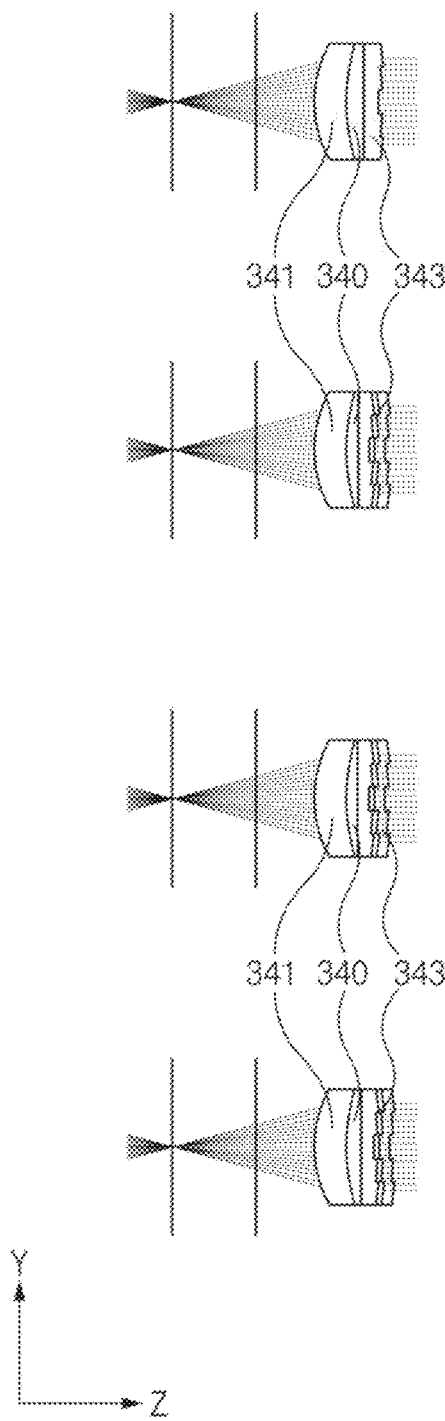
FIG. 5 is a side view of a plurality of third lens parts, when viewed from a side, according to an embodiment of the present disclosure.
Figure 6:
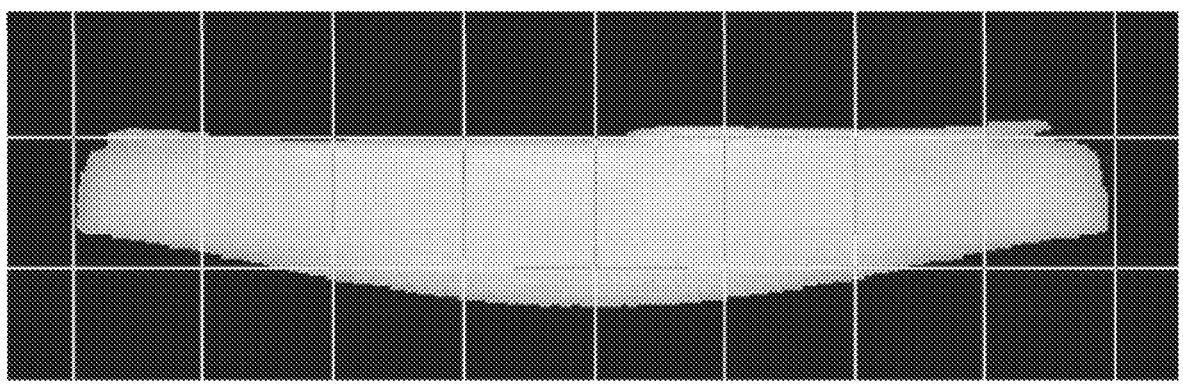
FIG. 6 is a view illustrating a third light distribution pattern by a third lamp module according to an embodiment of the present disclosure.
Figure 7:
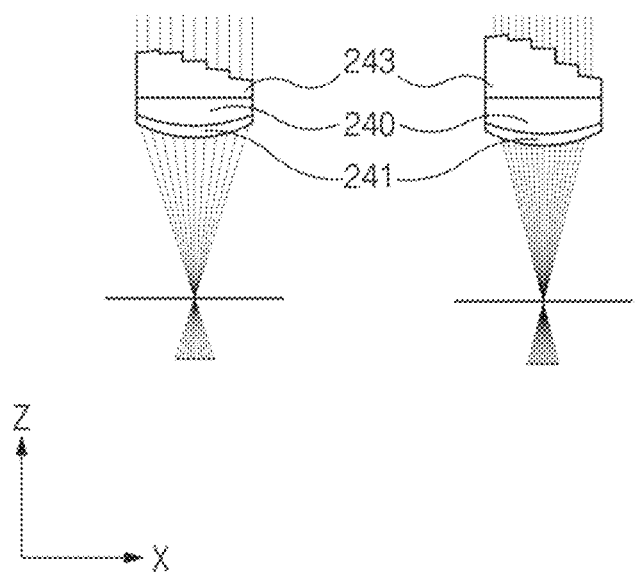
FIG. 7 is a top view illustrating a plurality of second lens parts, when viewed from a top, according to an embodiment of the present disclosure.
Figure 8:
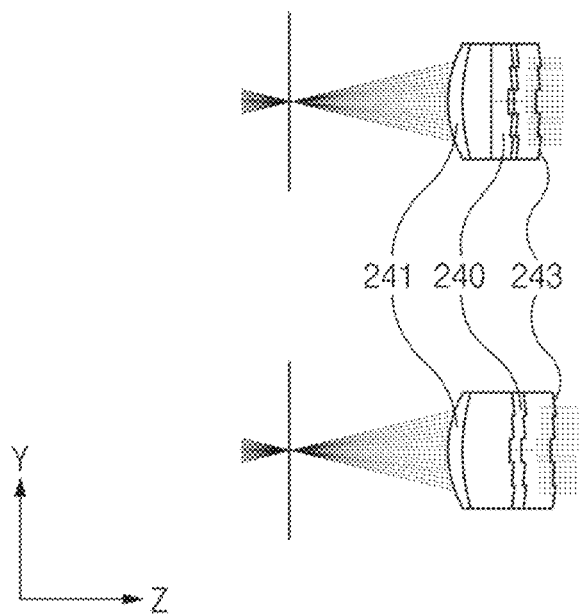
FIG. 8 is a view illustrating a plurality of second lens parts, when viewed from a side, according to an embodiment of the present disclosure.
Figure 9:
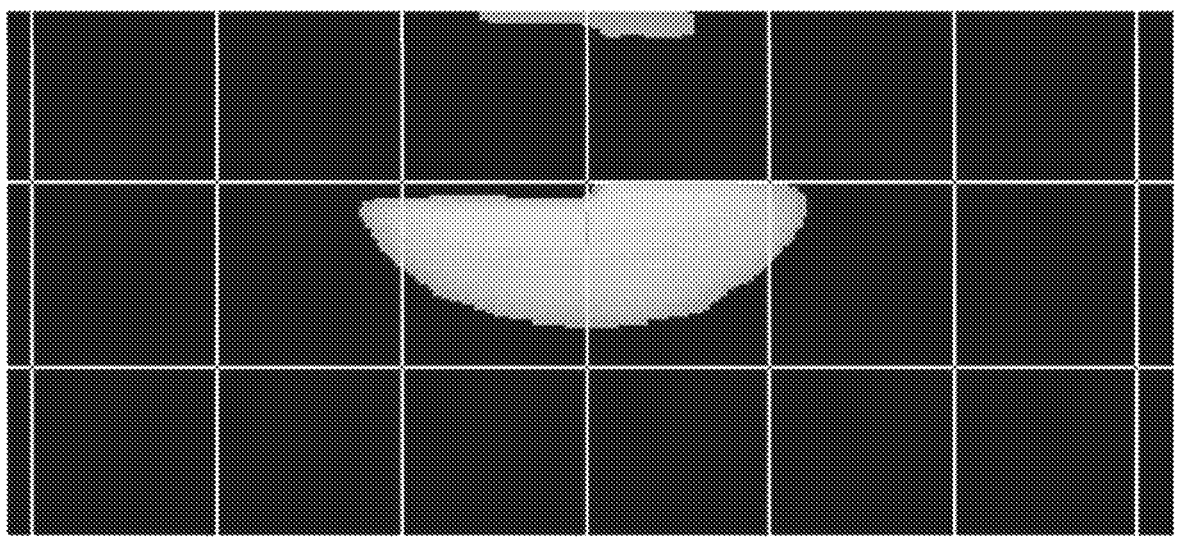
FIG. 9 is a view illustrating a second light distribution pattern by a second lamp module according to an embodiment of the present disclosure.
Figure 10:
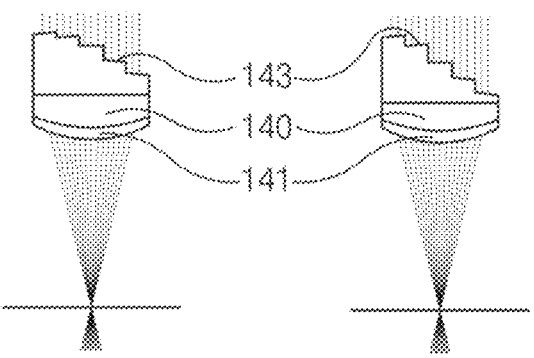
FIG. 10 is a top view illustrating a plurality of first lens parts, when viewed from a top, according to an embodiment of the present disclosure.
Figure 11:
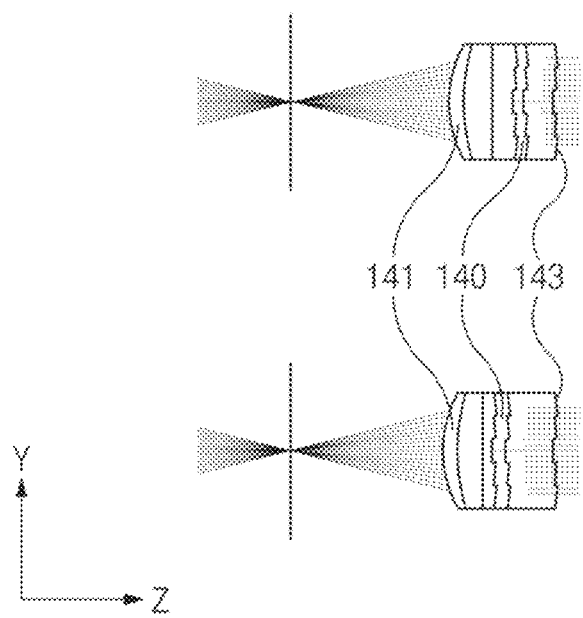
FIG. 11 is a view illustrating a plurality of first lens parts, when viewed from a side, according to an embodiment of the present disclosure.
Figure 12:
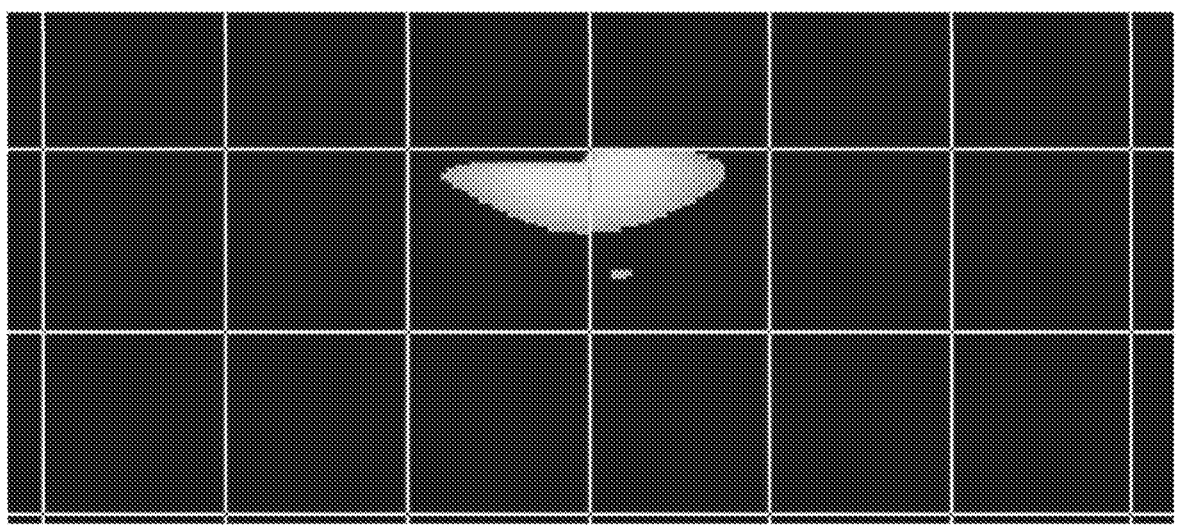
FIG. 12 is a view illustrating a first light distribution pattern by a first lamp module according to an embodiment of the present disclosure.

FIG. 1 is a view schematically illustrating a configuration of a lamp for a vehicle according to an embodiment of the present disclosure, FIG. 2 illustrates the lamp for a vehicle according to an embodiment of the present disclosure, and is a front view viewed toward a light output lens surface, FIG. 3 illustrates a first lens part, a second lens part, and a third lens part for each lamp module according to an embodiment of the present disclosure, FIG. 4 is a top view of a plurality of third lens parts, when viewed from a top, according to an embodiment of the present disclosure, FIG. 5 is a side view of the plurality of third lens parts, when viewed from a side, according to an embodiment of the present disclosure, FIG. 6 is a view illustrating a third light distribution pattern by a third lamp module according to an embodiment of the present disclosure, FIG. 7 is a top view illustrating a plurality of second lens parts, when viewed from a top, according to an embodiment of the present disclosure, FIG. 8 is a view illustrating the plurality of second lens parts, when viewed from a side, according to an embodiment of the present disclosure, FIG. 9 is a view illustrating a second light distribution pattern by a second lamp module according to an embodiment of the present disclosure, FIG. 10 is a top view illustrating a plurality of first lens parts, when viewed from a top, according to an embodiment of the present disclosure, FIG. 11 is a view illustrating the plurality of first lens parts, when viewed from a side, according to an embodiment of the present disclosure, and FIG. 12 is a view illustrating a first light distribution pattern by a first lamp module according to an embodiment of the present disclosure.

A lamp 10 for a vehicle according to embodiments of the present disclosure may be mainly used for a lighting function (for example, a headlamp or a fog lamp) or may be used for a signal function (for example, a turn signal lamp, a tail lamp, a brake lamp, or a side marker), and the present disclosure is neither limited nor restricted by the purpose of the lamp 10 for a vehicle. For example, the lamp 10 for a vehicle according to an embodiment may be used as headlamps for a vehicle, which are mounted on a front left side and a front right side of the vehicle.

Referring to FIGS. 1 to 12, the lamp 10 for a vehicle according to an embodiment of the present disclosure includes a first lamp module 100, a second lamp module 200, and a third lamp module 300.

The first lamp module 100 includes a first light source part 110 and a first lens part 140 that forms a first light distribution pattern with light irradiated from the first light source part 110. Furthermore, the second lamp module 200 includes a second light source part 210 and a second lens part 240 that forms a second light distribution pattern with light irradiated from the second light source part 210. Furthermore, the third lamp module 300 includes a third light source part 310 and a third lens part 340 that forms a third light distribution pattern with light irradiated from the third light source part 310.

Furthermore, the first lens part 140, the second lens part 240, and the third lens part 340 may be connected to each other to define one body. Furthermore, an output surface of the first lens part 140, an output surface of the second lens part 240, and an output surface of the third lens part 340 are integrated to define one light output lens surface.

In detail, one or two or more first lamp modules 100 may be provided, and each first lamp module 100 may include the first light source part 110, a first reflection part 120, a first shield part 130, and the first lens part 140.

Various elements or devices that may emit light may be used for the first light source part 110. For example, the first light source part 110 may include a first light source, and the first light source may be a light emitting diode (hereinafter, an LED). Furthermore, the first light source part 110 may include a first board, on which the first light source is mounted, and the first board may be a printed circuit board (PCB).

The first reflection part 120 may reflect and concentrate the light irradiated from the first light source part 110. The first shield part 130 may be disposed between the first light source part 110 and the first lens part 140 and may be configured to shield a portion of the light reflected by the first reflection part 120. An end of the first shield part 130 may restrict the light irradiated from the first light source part 110 to form a cut-off line in the light distribution pattern.

The first lens part 140 may form a first light distribution pattern with the light irradiated from the first light source part 110. In detail, the first lens part 140 may be disposed on an output side of the first shield part 130 to form a first light distribution pattern by projecting the light that passed through the first shield part 130.

Horizontal focuses and vertical focuses of the first lens part 140 may be formed to be the same to form a single focus (see FIGS. 10 and 11). For example, in the first lens part 140, a horizontal curvature and a vertical curvature of an input surface 141, to which the light is input, may be designed to be the same whereby a location of the horizontal focus and a location of the vertical focus may be the same.

The first shield part 130 may be disposed on the vertical focus of the first lens part 140. The end of the first shield part 130 may restrict the light irradiated from the first light source part 110 to form a cut-off line in the first light distribution pattern.

Meanwhile, one or two or more second lamp modules 200 may be provided, and each second lamp module 200 may include the second light source part 210, a second reflection part 220, a second shield part 230, and the second lens part 240.

The second light source part 210 may include various elements or devices that may emit light. For example, the second light source part 210 may include a second light source, and the second light source may be a light emitting diode (hereinafter, an LED). Furthermore, the second light source part 210 may include a second board, on which the second light source is mounted, and the second board may be a printed circuit board (PCB).

The second reflection part 220 may reflect and concentrate the light irradiated from the second light source part 210. The second shield part 230 may be disposed between the second light source part 210 and the second lens part 240 and may be configured to shield a portion of the light reflected by the second reflection part 220. An end of the second shield part 230 may restrict the light irradiated from the second light source part 210 to form a cut-off line in the light distribution pattern.

The second lens part 240 may form a second light distribution pattern with light irradiated from the second light source part 210. In detail, the second lens part 240 may be disposed on an output side of the second shield part 230 to form a second light distribution pattern by projecting the light that passed through the second shield part 230. Here, a shape of the second light distribution pattern may be different from that of the first light distribution pattern.

A horizontal focus and a vertical focus of the second lens part 240 may be formed to be the same to form a single focus (see FIGS. 7 and 8). For example, in the second lens part 240, a horizontal curvature and a vertical curvature of an input surface 241, to which the light is input, may be designed to be the same whereby a location of the horizontal focus and a location of the vertical focus may be the same.

The second shield part 230 may be disposed on the vertical focus of the second lens part 240. Accordingly, the end of the second shield part 230 may restrict the light irradiated from the second light source part 210 to form a cut-off line in the second light distribution pattern.

Meanwhile, one or two or more third lamp modules 300 may be provided, and each third lamp module 300 may include the third light source part 310, a third reflection part 320, a third shield part 330, and the third lens part 340.

The third light source part 310 may include various elements or devices that may emit light. For example, the third light source part 310 may include a third light source, and the third light source may be a light emitting diode (hereinafter, an LED). Furthermore, the third light source part 310 may include a third board, on which the third light source is mounted, and the third board may be a printed circuit board (PCB).

However, kinds and structures of the first light source part 110, the second light source part 210, and the third light source part 310 are not limited to the above description, and as an example, various lights, such as laser diodes, bulbs, halogen lamps, or xenon lamps (HIDs) may be used.

The third reflection part 320 may reflect and concentrate the light irradiated from the third light source part 310. The third shield part 330 may be disposed between the third light source part 310 and the third lens part 340 and may be configured to shield a portion of the light reflected by the third reflection part 320.

For example, the third shield part 330 may be disposed on the vertical focus of the third lens part 340. Accordingly, an end of the third shield part 330 may be configured to restrict the light irradiated from the third light source part 310 to form a cut-off line in the light distribution pattern.

The plurality of first reflection parts 120, the plurality of second reflection parts 220, and the plurality of third reflection parts 320 may be disposed to face opposite directions to the output directions thereof as they go from one side to an opposite side in a leftward/rightward direction "X". This is for corresponding to a curvature of an outer lens.

Furthermore, here, sizes and shapes of the first reflection part 120, the second reflection part 220, and the third reflection part 320 may be formed to be different from one another. Accordingly, light distribution characteristics of the first light distribution pattern, the second light distribution pattern, and the third light distribution pattern may be formed to be different from one another.

The first shield part 130, the second shield part 230, and the third shield part 330 may be disposed to face opposite directions to the output directions thereof as they go from one side to an opposite side in the leftward/rightward direction "X". This is for corresponding to a curvature of an outer lens.

Furthermore, here, sizes and shapes of the first shield part 130, the second shield part 230, and the third shield part 330 may be formed to be different from one another. Accordingly, light distribution characteristics of the first light distribution pattern, the second light distribution pattern, and the third light distribution pattern may be formed to be different from one another.

The third lens part 340 may form a third light distribution pattern with light irradiated from the third light source part 310. In detail, the third lens part 340 may be disposed on an output side of the third shield part 330 to form a third light distribution pattern by projecting the light that passed through the third shield part 330. Here, the third light distribution pattern may be a light distribution pattern having characteristics that are different from those of the first light distribution pattern and the second light distribution pattern.

The aspect that the characteristics of the light distribution patterns are different from one another in the specification means that light distribution characteristics and projected pattern images of the first light distribution pattern, the second light distribution pattern, and the third light distribution pattern are different from one another. This may be implemented by the differences between the characteristics and the shapes of the reflection parts and the shield parts of the lens parts provided in the lamp modules.

For example, the first light distribution pattern may be a long-distance light distribution pattern (hot zone spot) for securing a field of view of a central area of a front side. Furthermore, the third light distribution pattern may be a light distribution pattern (wide zone) for securing a field of view of a peripheral area of a front side and a visibility during turning. The second light distribution pattern is a light distribution pattern (hot zone spread) for minimizing a foreign texture between the first light distribution pattern (hot zone spot) and the third light distribution pattern (wide zone), and may be designed to secure a relatively wide area as compared with the first light distribution pattern.

Here, locations of the third lens part 340, at which the light is concentrated on the horizontal direction and the vertical direction, may be formed to be different from one another (sec FIGS. 4 and 5).

For example, in the third lens part 340, a horizontal curvature and a vertical curvature of an input surface 341 may be different from one another. In this way, because the third lens part 340 is designed such that the horizontal curvature and the vertical curvature thereof are different, a location, at which the light is concentrated in the horizontal direction, and a location, at which the light is concentrated in the vertical direction, may be different. In detail, the third lens part 340 may not form a horizontal focus (see FIG. 4), but may form only a vertical focus (sec FIG. 5).

In this way, the lamp 10 for a vehicle according to an embodiment of the present disclosure includes a plurality of unit lamp modules that are designed to be separated according to light distribution characteristics and images whereby it may be designed such that an optical efficiency of the lamp 10 for a vehicle is optimized.

Meanwhile, the light output lens surface may include a plurality of multi-facet lenses that are formed to be gradually stepped toward an opposite direction to the output direction, in which the light is output, as they (i.e., the multi-facet lenses) go from (i.e., extend from) one side to an opposite side of the light output lens surface in the leftward/rightward direction "X". For example, the one side in the leftward/rightward direction "X" may be an inboard direction of the vehicle, and the opposite side in the leftward/rightward direction "X" may be an outboard direction of the vehicle.

Furthermore, the first optic module, the second optic module, and the third module may be arranged in the leftward/rightward direction "X", and the first lens part 140, the second lens part 240, and the third lens part 340 may be arranged in the leftward/rightward direction "X" and may be integrally formed. In FIGS. 1 to 12, "X" means a horizontal direction (leftward/rightward direction), "Y" means a vertical direction (upward/downward direction) with respect to a ground surface, and "Z" means an output direction.

The first lamp module 100, the second lamp module 200, and the third lamp module 300 may be arranged in a specific form, and one or a plurality of first lamp modules 100, one or a plurality of second lamp modules 200, and one or a plurality of third lamp modules 300 may be provided.

For example, as in the illustrated embodiment, two first lamp modules 100, two second lamp modules 200, and fourth third lamp modules 300 may be provided, and the first lamp modules 100, the second lamp modules 200, and the third lamp modules 300 may be arranged in a stepped manner. However, the arrangements and the numbers of the first lamp modules 100, the second lamp modules 200, and the third lamp modules 300 are not limited to the above description, and the forms and the numbers thereof may be modified to be carried out.

Meanwhile, the light output lens surface has a form, in which the output surface of the first lens part 140, the output surface of the second lens part 240, and the output surface of the third lens part 340 are integrated. The light output lens surface may include a plurality of multi-facet lenses. Furthermore, the plurality of multi-facet lenses may be formed to be gradually stepped toward an opposite direction to the output direction that is a direction, in which the light is output, as they go from an inboard side to an outboard side.

In detail, the first lens part 140 may include the first input surface 141, to which the light is input, and a first output surface 143, from which the light is output, and the second lens part 240 may include the second input surface 241, to which the light is input, and a second output surface 243, from which the light is output. Furthermore, the third lens part 340 may include the third input surface 341, to which the light is input, and a third output surface 343, from which the light is output.

The first lens part 140, the second lens part 240, and the third lens part 340 may be formed as one body, and the first output surface 143, the second output surface 243, and the third output surface 343 may be continuously formed to define the light output lens surface. That is, the light output lens surface may be formed in an area that includes all the areas corresponding to the first input surface 141, the second input surface 241, and the third input surface 341.

The light output lens surface may include the plurality of multi-facet lenses, and the plurality of multi-facet lenses may be gradually stepped toward one direction. In detail, the adjacent multi-facet lenses are formed to be stepped, and thus the light output lens surface may have a form, in which it is curved to face a light source direction as it goes from the inboard side to the outboard side.

In other words, the light output lens surface according to the present disclosure are not formed to be stepped in unit of the lamp modules, but may be formed to be stepped in unit of the multi-facet lenses. That is, the multi-facet lens that defines the light output lens surface may be arranged in a stepped manner. Accordingly, an intermittent texture of the lamp image and the lighting image may be minimized and a softer image may be implemented.

In this way, according to an embodiment of the present disclosure, the multi-facet lens is used in the output lens whereby a continuous lamp image and a continuous lighting image may be implemented and a required optic performance may be satisfied.

According to an embodiment of the present disclosure, the lamp 10 for a vehicle that satisfies an optical performance with no glare phenomenon even when a slim output lens having a curvature is used may be implemented.

Furthermore, according to an embodiment of the present disclosure, because the plurality of lamp modules may be implemented by using the single lens having the multi-facet lenses, they may be structurally simplified and an image having a jewelry texture may be exhibited whereby the lamp design may be differentiated.

Accordingly, according to the present disclosure, a competitiveness of the product may be enhanced.

Meanwhile, referring to FIGS. 1 and 3, the steps between the plurality of multi-facet lenses become larger as they go from the one side to the opposite side in the leftward/rightward direction "X".

In detail, when imaginary surfaces obtained by connecting centers of the adjacent multi-facet lenses in the leftward/rightward direction "X" is imaginary inclined surfaces, angles of the imaginary inclined surfaces are formed to become larger in the lamp modules that are disposed more toward from the one side to the opposite side of the light output lens surfaces in the leftward/rightward direction "X".

FIG. 3 illustrates the first lens part 140, the second lens part 240, and the third lens part 340, respectively.

A1 and A2 denote the first lens parts 140, B1 and B2 denote the second lens parts 240, and C1, C2, C3, and C4 denote the third lens parts 340. G1, G2, G3, and G4 denote the imaginary inclined surface of the plurality of third output surfaces 343, G5 and G6 denote the imaginary inclined surfaces of the plurality of second output surfaces 243, and G7 and G8 denote the imaginary inclined surfaces or the plurality of first output surfaces 143.

As illustrated, an inclination degree of the imaginary inclined surface G1 of the third lamp module 300, which is disposed at one end thereof in the leftward/rightward direction "X", may be smallest, and an inclination degree of the imaginary inclined surface G8 of the first lamp module 100, which is disposed at an opposite end thereof in the leftward/rightward direction "X", may be largest. Furthermore, inclination degrees of the multi-facet lenses provided in the plurality of lamp modules may be formed to become larger as they go from the one side in the leftward/rightward direction "X" to the opposite side in the leftward/rightward direction "X". That is, the sizes of the inclination angles may become larger in the sequence of G1, G2, G3, G4, G5, G6, G7, and G8.

Meanwhile, as described above, even when the light output lens surfaces are formed to be stepped in unit of the multi-facet lenses, the focuses may be formed for respective lamp modules. Accordingly, the light distribution characteristics of the light distribution pattern formed by the lamp modules may be different.

In detail, the first input surface 141, the second input surface 241, and the third input surface 341 may be formed to be stepped toward the opposite direction to the output direction as they go from the one side to the opposite side in the leftward/rightward direction "X". Furthermore, as described above, the first lens part 140 and the second lens part 240 may be designed such that the vertical focuses and the horizontal focuses thereof are the same (i.e., coincident). Furthermore, the third lens part 340 may form only the vertical focus to form the cut-off line while not forming a point focus.

Meanwhile, a plurality of first lamp modules 100, a plurality of second lamp modules 200, and a plurality of third lamp modules 300 may be provided. For example, as described above, two first lamp modules 100, two second lamp modules 200, and four third lamp modules 300 may be provided. However, the numbers of lamp modules are not limited to the above description.

Furthermore, the plurality of first input surfaces 141 provided in the plurality of first lamp modules 100 may be formed to be stepped, the plurality of second input surfaces 241 provided in the plurality of second lamp modules 200 may be formed to be stepped, and the plurality of third input surfaces 341 provided in the plurality of third lamp modules 300 may be formed to be stepped.

In detail, the plurality of first input surfaces 141 provided in the plurality of first lens parts 140, respectively, may be formed to be stepped toward the opposite side in the leftward/rightward direction "X". The plurality of second input surfaces 241 provided in the plurality of second lens parts 240, respectively, may be formed to be stepped toward the opposite side in the leftward/rightward direction "X". The plurality of third input surfaces 341 provided in the plurality of third lens parts 340, respectively, may be formed to be stepped toward the opposite side in the leftward/rightward direction "X".

Accordingly, by using the lamp 10 for a vehicle according to the present disclosure, a lamp that satisfies light distribution characteristics with neither glare phenomenon nor an intermittent texture even when the lamp 10 for a vehicle is disposed at a curved part of the vehicle body or the outer lens.

According to the above-described embodiment of the present disclosure, a continuous lighting image and a lamp image may be implemented by using the multi-facet lenses in the output lens, and a required optical performance may be satisfied.

According to an embodiment of the present disclosure, a lamp for a vehicle that satisfies an optical performance with no glare phenomenon even when the slim output lens having a curvature is used may be implemented.

Although the specific embodiments of the present disclosure have been described above, the spirits and range of the present disclosure are not limited thereto, and the present disclosure may be variously corrected and modified by an ordinary person in the art, to which the present disclosure pertains, while not changing the essence of the present disclosure described in the claims.

What is claimed is:

1. A lamp for a vehicle, comprising:
   a first lamp module including a first light source part and a first lens part configured to form a first light distribution pattern with light irradiated from the first light source part;
   a second lamp module including a second light source part and a second lens part configured to form a second light distribution pattern with light irradiated from the second light source part; and
   a third lamp module including a third light source part and a third lens part configured to form a third light distribution pattern with light irradiated from the third light source part, wherein:

the first lens part, the second lens part, and the third lens part are connected to each other to define one body, an output surface of the first lens part, an output surface of the second lens part, and an output surface of the third lens part are integrated to form one light output lens surface to provide output light from the vehicle lamp, and the one light output lens surface includes a plurality of multi-facet lenses formed on the one light output lens surface to be sloped to provide a slope on the one light output lens surface between adjacent ones of the multi-facet lenses toward an opposite direction to an output direction of the output light as the multi-facet lenses extend on the one light output surface from one side to an opposite side of the one light output lens surface in a leftward/rightward direction, wherein:

the plurality of multi-facet lenses of the one light output lens surface are formed such that the slope between the ones of the adjacent multi-facet lenses becomes larger as the multi-facet lenses extend from the one side to the opposite side in the leftward/rightward direction to provide a curvature for the lamp, a horizontal focus and a vertical focus of the first lens part are formed to be coincident, a horizontal focus and a vertical focus of the second lens part are formed to be coincident, and a horizontal curvature and a vertical curvature of an input surface of the third lens part are different from one another so that a location of a horizontal focus, at which the light is concentrated in the horizontal direction, and a location of a vertical focus, at which the light is concentrated in the vertical direction, are different from one another, and so that the vertical focus forms a cut-off line.

2. The lamp of claim 1, wherein the first lamp module, the second lamp module, and the third lamp module are arranged in a specific form providing one or a plurality of first lamp modules, one or a plurality of second lamp modules, and one or a plurality of third lamp modules.

3. The lamp of claim 1, wherein, when an imaginary surface obtained by connecting centers of adjacent multi-facet lenses in the leftward/rightward direction is defined as an imaginary inclined surface, inclination angles of inclination planes of a plurality of the imaginary inclined surfaces of the multi-facet lenses increase as the multi-facet lenses extend from the one side to the opposite side in the leftward/rightward direction.

4. The lamp of claim 1, wherein:

the first lens part includes a first input surface to which the light from the first light source part is input, the second lens part includes a second input surface to which the light from the second light source part is input, the third lens part includes a third input surface to which the light from the third light source part is input, and the first input surface, the second input surface, and the third input surface are formed to be stepped to face the opposite direction to the output direction as they extend from the one side to the opposite side in the leftward/rightward direction.

5. The lamp of claim 4, including a plurality of first lamp modules, a plurality of second lamp modules, and a plurality of third lamp modules, wherein:

a plurality of first input surfaces provided in the plurality of first lamp modules are stepped with each other, a plurality of second input surfaces provided in the plurality of second lamp modules are stepped with each other, and a plurality of third input surfaces provided in the plurality of third lamp modules are stepped with each other.

6. The lamp of claim 1, wherein:

the first lamp module includes a first reflection part configured to concentrate the light irradiated from the first light source part, the second lamp module includes a second reflection part configured to concentrate the light irradiated from the second light source part, the third lamp module includes a third reflection part configured to concentrate the light irradiated from the third light source part, and at least one of sizes and shapes of the first reflection part, the second reflection part, and the third reflection part are formed to be mutually different.

7. The lamp of claim 6, wherein the second reflection part is placed farther forward on the vehicle than the first reflection part, and the third reflection part is placed farther forward on the vehicle than the second reflection part.

8. The lamp of claim 6, wherein:

the first lamp module includes a first shield part configured to shield a portion of the light reflected by the first reflection part, the second lamp module includes a second shield part configured to shield a portion of the light reflected by the second reflection part, the third lamp module includes a third shield part configured to shield a portion of the light reflected by the third reflection part, and the first shield part, the second shield part, and the third shield part have at least one of different sizes and shapes with respect to each other.

9. The lamp of claim 8, wherein the second shield part is placed farther forward on the vehicle than the first shield part, and the third shield part is placed farther forward on the vehicle than the second shield part.

10. The lamp of claim 8, wherein the third shield part is disposed on a vertical focus of the third lens part.

11. The lamp of claim 1, wherein:

the one side of the output light surface is an inboard side of the vehicle on which the lamp is configured to be mounted, and the opposite side of the output light surface is an outboard side of the vehicle so that the multi-facet lenses are arranged to be sloped to extend from the inboard side to the outboard side of the vehicle on which the lamp is configured to be mounted.

12. The lamp of claim 1, wherein:

the first lens part includes a first input surface to which light from the first light source part is input, the second lens part includes a second input surface to which the light from the second light source part is input, the third lens part includes a third input surface to which the light from the third light source part is input, the first input surface, the second input surface, and the third input surface are formed to be stepped to face the opposite direction to the output direction as they extend from the one side to the opposite side in the leftward/rightward direction, the first lamp module includes a first reflection part configured to concentrate the light irradiated from the first light source part, the second lamp module includes a second reflection part configured to concentrate the light irradiated from the second light source part, the third lamp module includes a third reflection part configured to concentrate the light irradiated from the third light source part, and at least one of sizes and shapes of the first reflection part, the second reflection part, and the third reflection part are formed to be mutually different.

13. The lamp of claim 12, including a plurality of first lamp modules, a plurality of second lamp modules, and a plurality of third lamp modules, wherein:

a plurality of first input surfaces provided in the plurality of first lamp modules are stepped with each other, a plurality of second input surfaces provided in the plurality of second lamp modules are stepped with each other, and a plurality of third input surfaces provided in the plurality of third lamp modules are stepped with each other.

14. The lamp of claim 12, wherein the second reflection part is placed farther forward on the vehicle than the first reflection part, and the third reflection part is placed farther forward on the vehicle than the second reflection part.

15. The lamp of claim 12, wherein:

the first lamp module includes a first shield part configured to shield a portion of the light reflected by the first reflection part, the second lamp module includes a second shield part configured to shield a portion of the light reflected by the second reflection part, the third lamp module includes a third shield part configured to shield a portion of the light reflected by the third reflection part, and the first shield part, the second shield part, and the third shield part have at least one of different sizes and shapes with respect to each other.

16. The lamp of claim 15, wherein the second shield part is placed farther forward on the vehicle than the first shield part, and the third shield part is placed farther forward on the vehicle than the second shield part.

17. The lamp of claim 15, wherein the third shield part is disposed on a vertical focus of the third lens part.

18. The lamp of claim 4, wherein the steps between the first input surface, the second input surface, and the third input surface become larger as they extend from the one side to the opposite side in the leftward/rightward direction.

* * * * *